(12) United States Patent
Prochazka, Jr. et al.

(10) Patent No.: US 9,203,123 B2
(45) Date of Patent: Dec. 1, 2015

(54) LITHIUM ACCUMULATOR

(75) Inventors: Jan Prochazka, Jr., Kamenne Zehrovice (CZ); Jan Prochazka, Sr., Kamenne Zehrovice (CZ); Jaroslav Polivka, Prague (CZ); Jiri Postler, Lodenice (CZ)

(73) Assignee: HE3DA s.r.o., Prague (CZ)

( * ) Notice: Subject to any disclaimer, the term of this patent is extended or adjusted under 35 U.S.C. 154(b) by 226 days.

(21) Appl. No.: 13/823,889

(22) PCT Filed: Sep. 20, 2011

(86) PCT No.: PCT/IB2011/054109
§ 371 (c)(1),
(2), (4) Date: Mar. 15, 2013

(87) PCT Pub. No.: WO2012/038887
PCT Pub. Date: Mar. 29, 2012

(65) Prior Publication Data
US 2013/0177786 A1  Jul. 11, 2013

(30) Foreign Application Priority Data
Sep. 23, 2010 (CZ) .............................. PV2010-703

(51) Int. Cl.
| | | |
|---|---|---|
| *H01M 10/50* | (2006.01) | |
| *H01M 10/613* | (2014.01) | |
| *H01M 2/40* | (2006.01) | |
| *H01M 10/02* | (2006.01) | |
| *H01M 10/04* | (2006.01) | |
| *H01M 10/052* | (2010.01) | |
| *H01M 10/42* | (2006.01) | |
| *H01M 10/663* | (2014.01) | |
| *H01M 10/647* | (2014.01) | |
| *H01M 10/654* | (2014.01) | |
| *H01M 10/6568* | (2014.01) | |
| *H01M 10/6557* | (2014.01) | |
| *H01M 10/6554* | (2014.01) | |
| *H01M 4/02* | (2006.01) | |

(52) U.S. Cl.
CPC ............ *H01M 10/5004* (2013.01); *H01M 2/40* (2013.01); *H01M 10/02* (2013.01); *H01M 10/0413* (2013.01); *H01M 10/0486* (2013.01); *H01M 10/052* (2013.01); *H01M 10/4242* (2013.01); *H01M 10/613* (2015.04); *H01M 10/647* (2015.04); *H01M 10/654* (2015.04); *H01M 10/6554* (2015.04); *H01M 10/6557* (2015.04); *H01M 10/6568* (2015.04); *H01M 10/663* (2015.04); *H01M 2004/021* (2013.01); *Y02E 60/122* (2013.01)

(58) Field of Classification Search
CPC ..................... H01M 10/5059; H01M 10/5075; H01M 2/022
See application file for complete search history.

(56) References Cited

U.S. PATENT DOCUMENTS

| | | | |
|---|---|---|---|
| 4,681,105 A * | 7/1987 | Tritt | 606/52 |
| 5,795,680 A | 8/1998 | Ikeda et al. | |
| 5,879,834 A | 3/1999 | Mao | |
| 6,136,287 A | 10/2000 | Horne et al. | |
| 6,197,450 B1 | 3/2001 | Nathan et al. | |
| 6,432,586 B1 | 8/2002 | Zhang | |
| 6,818,347 B1 | 11/2004 | Jin et al. | |
| 7,727,667 B2 | 6/2010 | Sakurai | |
| 7,820,321 B2 | 10/2010 | Horne et al. | |
| 2002/0142216 A1* | 10/2002 | Skoumpris | 429/181 |
| 2003/0215702 A1 | 11/2003 | Tanjou et al. | |
| 2005/0147874 A1* | 7/2005 | Andersen et al. | 429/87 |
| 2005/0221192 A1 | 10/2005 | Hennige et al. | |
| 2007/0092798 A1 | 4/2007 | Spitler | |
| 2007/0134554 A1 | 6/2007 | Armand et al. | |
| 2007/0224504 A1* | 9/2007 | Kita et al. | 429/231.1 |
| 2007/0224505 A1* | 9/2007 | Kita et al. | 429/231.1 |
| 2008/0006604 A1 | 1/2008 | Keady | |
| 2008/0032197 A1 | 2/2008 | Horpel et al. | |
| 2011/0003185 A1 | 1/2011 | Kritzer | |
| 2011/0003197 A1 | 1/2011 | Kritzer et al. | |
| 2011/0165457 A1 | 7/2011 | Prochazka, Jr. et al. | |
| 2011/0269008 A1* | 11/2011 | Houchin-Miller et al. | 429/120 |

FOREIGN PATENT DOCUMENTS

| | | |
|---|---|---|
| DE | 10 2008 034 867 | 1/2010 |
| EP | 1 244 168 | 9/2002 |
| EP | 1 577 966 | 9/2005 |
| EP | 2 284 425 | 2/2011 |
| JP | H09-213307 A | 8/1997 |
| WO | 2004/021475 A1 | 3/2004 |
| WO | 2006/010894 A1 | 2/2006 |
| WO | 2006/045339 A2 | 4/2006 |
| WO | WO 2006/124663 A2 | 11/2006 |
| WO | WO 2008/153749 | 12/2008 |
| WO | WO 2010/005954 | 1/2010 |
| WO | WO 2010/028692 | 3/2010 |
| WO | WO 2010/031363 | 3/2010 |
| WO | WO 2010056750 A2 * | 5/2010 |

OTHER PUBLICATIONS

International Search Report of PCT/IB2011/054109, date of mailing Apr. 18, 2012.

\* cited by examiner

*Primary Examiner* — Ula C Ruddock
*Assistant Examiner* — Scott J Chmielecki
(74) *Attorney, Agent, or Firm* — Collard & Roe, P.C.

(57) ABSTRACT

A lithium accumulator containing positive and negative electrodes with a minimum thickness of 0.5 mm, separated by separators, where each electrode is deposited into a hole in a frame, as a part of a set of frames arranged in a stack between marginal covers, with electrical insulation between the frames of opposite electrodes and additional current collectors between identical electrodes, wherein each frame comprises at least one channel for passage of a heat exchange media and the channels of the individual frames are interconnected. Liquid accumulator electrolyte may be used as a heat exchange media.

13 Claims, 10 Drawing Sheets

LITHIUM ACCUMULATOR

CROSS REFERENCE TO RELATED APPLICATIONS

This application is the National Stage of PCT/IB2011/054109 filed on Sep. 20, 2011, which claims priority under 35 U.S.C. §119 of Czech Republic Application No. PV2010-703 filed on Sep. 23, 2010, the disclosure of which is incorporated by reference. The international application under PCT article 21(2) was published in English.

TECHNICAL FIELD

The invention relates to a lithium accumulator comprising positive and negative electrodes with a minimum thickness of 0.5 mm, separated by separators, where each electrode is placed into holes in a frame, which is a part of set of frames arranged in a stack between marginal covers, with electrical insulation between the frames of electrodes with opposite polarity and additional current collectors between the frames of the same polarity.

BACKGROUND ART

Using high-capacity accumulators and accumulator modules is associated with a problem of ratio between the increasing accumulator power and weight vs. room available for removal of heat generated in chemical reactions during the accumulator charging and discharging. Any major overheating of the accumulator can result in a fire or explosion. Operation of the accumulator outside the safe temperature range can also significantly reduce the accumulator service life. Maintaining the operating temperature in a safe range to eliminate the above-described accidents requires additional equipment to ensure greater exchange of heat. Such equipment may also be required where extremely low temperatures reduce the accumulator power substantially and it is necessary to raise the operating temperature by heat exchange.

One possible solution to cooling of a set of batteries offers PCT application WO2006124663. The application describes a substrate, respective a body into which the groups of battery units are placed creating a battery set resistant to vibrations, and further shows heat transfer medium pipes passing through the battery set.

A similar solution with a somewhat different arrangement of battery units and heat transfer tubes passing along the individual sections of the battery units is disclosed in WO2010028692. In both described systems, the heat is transferred from the accumulator casing, not directly from its interior space. This logically reduces the heat exchange rate between the battery core and the cooling medium.

According to the German patent application No. DE 10 2008 034 867, the accumulator cooling is provided by the current collectors on cells consisting of thin film planar lithium electrodes. The collectors transfer the heat losses from the battery via an electro insulating, thermally conductive film to a heat exchange plate on the top of the accumulator, which can optionally be connected to a vehicle cooling system. In this arrangement, the heat is removed through the current collectors directly from inside of the accumulator. The problem still is in further transfer of heat from such folio current collectors to the actual heat exchange system. Moreover, the heat transfer is reduced by using an electro insulating film and the heat transfer capacity is limited to a single heat exchange plate.

PCT application WO WO2010031363 discloses a lithium accumulator comprising metal frames arranged in a stack, where each frame contains a puncture, in which one thick three dimensional (3D) electrode is placed, and whereby the electrodes of opposite polarity are separated by separators and the frames with electrodes of opposite polarity are isolated from each other. Although the metal frames allow better heat transfer from the inside of the accumulator stack, they do not guarantee a reliable heat transfer from large-sized electrodes and especially from modules with number of stacks arranged side by side. I

DISCLOSURE OF INVENTION

Technical Problem

It is an objective of the present invention to provide an accumulator with a heat exchange system that enables more efficient transfer of the heat from the inside of an accumulator, thus creating conditions for intensive cooling of all types of accumulators based on three dimensional electrodes, including high storage capacity systems. Another objective of the invention is to create an accumulator which, in connection with a specific heat exchange system offers increased service life and high operational safety.

Technical Solution

The object of this invention can be achieved and the described deficiencies overcome by a lithium accumulator comprising positive and negative electrodes separated by separators, deposited into holes in frame, which is a part of a set of frames arranged in a stack between marginal covers, with electrical insulation between the frames of electrodes opposite polarity and additional current collectors between frames of electrodes with identical polarity, whereby each frame comprises at least one channel for passage of a heat exchange medium and the channels in the individual frames are interconnected.

Hereinafter, other advantageous embodiments of the invention are described that further develop or specify in more details its essential features but without limiting the scope of the invention.

Each frame contains more than one identically situated hole for an electrode and at least one channel identically positioned between the hole openings, whereby the electrodes placed into the holes in the frames form together with the adjacent frame walls, separators, electro-insulating materials and current collectors the individual accumulator modules and the channels create passages for the heat exchange medium.

The covers include a system of interconnected grooves on the inner side, wherein at least one cover is connected to the electrolyte inlet. A distribution board with holes connecting the groove system with the openings in the frame is positioned between the cover and the first adjacent frame. Pipes ending in the holes at the distribution board are located within the passages and connected to the heat exchange media distribution system. Expanded metal or a grid can be used instead of the distribution board in some cases.

The heat exchange medium distribution system can include a pump and an external heat exchanger.

Advantageously, the heat exchange medium is an electrolyte and the frames carrying identical electrodes are provided with grooves on their adjacent side connecting the passages with the electrode holes.

In a simple embodiment of the accumulator with an electrolyte as a heat exchange medium but without external heat exchange medium system, one cover comprises an inlet of electrolyte and the other cover is provided with an inlet branch for connecting to an air-relief valve. When the electrolyte external cooling system is used, one cover is connected to the inlet piping of the electrolyte distribution system and the other cover is connected to the return piping of the electrolyte distribution system. The electrolyte distribution system includes a pump and an external heat exchanger, where an electrolyte regeneration unit may also be incorporated into the return piping.

The frames have external electrical contacts and electrically conductive foils as additional current collectors between the frames of electrodes with the same polarity. Said additional collectors can be perforated, whereby the electrically interconnected frames with identical polarity form the accumulator poles.

The electro insulating material is a plasma coated porous electro insulating material. This material can be selected from the group of ceramic oxides $Al_2O_3$, $SiO_2$, $ZrO_2$ poly-tetrafluoroethylene, polyfluoride-hexafluoropropene, polycycloolefine.

Both covers are preferably connected to one pole of the accumulator.

Advantageous Effects

The invention is based on the use of a stack of metal frames with holes into which the 3D electrodes are placed. It is to be understood that the term 3D refers to the electrodes having a minimum thickness of 0.5 mm contrary to thin film electrodes having substantially lower thickness. Placing the electrodes into frames provides the accumulator necessary mechanical resistance against impact, pressure and vibrations. Moreover, the frames allow distribution and exchange of heat inside the accumulator and also serve as current collectors, poles of the individual electrodes and the current terminals. In one embodiment of the invention, the external heat exchange medium is supplied into the accumulator by means of tubes passing through the passageways formed by channels in the frames and usually connected to an external heat exchange medium circulation system.

In the event where the electrolyte is used as a heat exchange media, the electrolyte is supplied to the electrodes by mean of mutually connected passages and grooves in the frames. The electrolyte media is of the same type as present in the electrodes, separators and the distribution system. In such an embodiment, the entire accumulator stack can be situated in a casing and connected to an external heat exchange media (electrolyte) distribution system.

The design of marginal covers with grooves, distribution boards with holes, and frames with distribution grooves or porous ceramic or metal layer, preferably made by plasma coating, render additional means ensuring perfect filling up of the accumulator by the electrolyte as well as the replacement and degassing thereof.

Integration of an electrolyte regeneration unit and a cleaning filter further enhance the service time of the electrolyte and consequently increase the life of electrodes and accumulator as a whole. The compact configuration of such effectively cooled modules enables to construct an accumulator with an optimal distribution of its volume between the frames, cooling system and electrode capacity, achieving the specific capacity of at least 250 Wh/liter, when using conventional active materials for electrodes, such as NMC ($LiCo_{1/3}Mn_{1/3}Ni_{1/3}O_2$) and graphite.

DESCRIPTION OF DRAWINGS

Certain of the possible embodiments of the invention are further described by way of examples with reference to the related schematic drawings. In the drawings.

BEST MODE

The following examples represent various accumulator cooling systems, whereby the identical or nearly identical components as for their function and purpose bear the same referring numerals.

Figure 1:
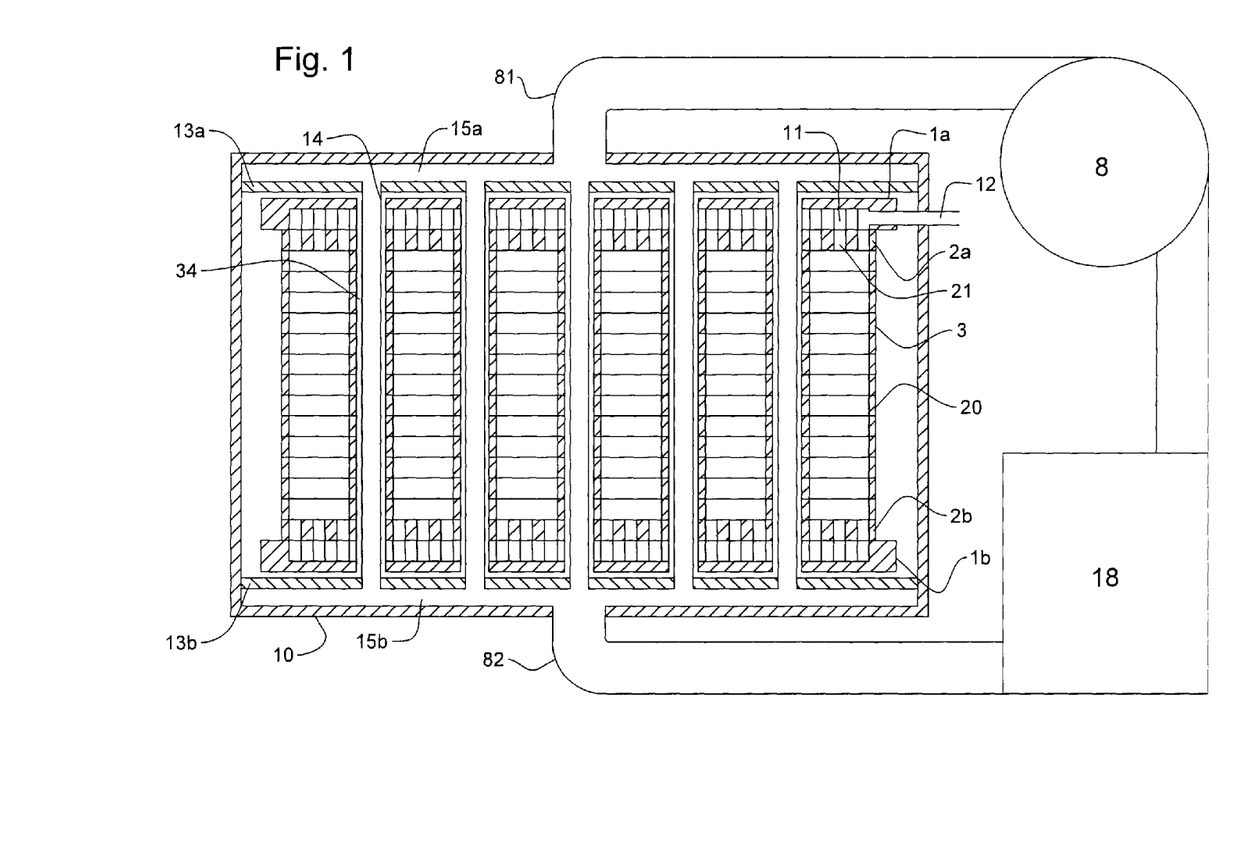
FIG. 1 is a front sectional view of an accumulator with a separated external circulation distribution system for a heat exchange medium.
Figure 2:
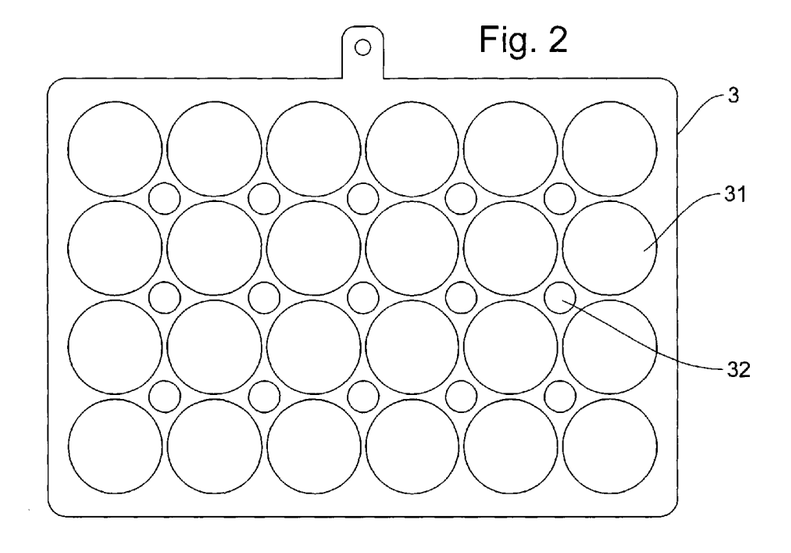
FIG. 2 is a front sectional view of a frame with holes for electrodes and channels for heat exchange media.
Figure 4:
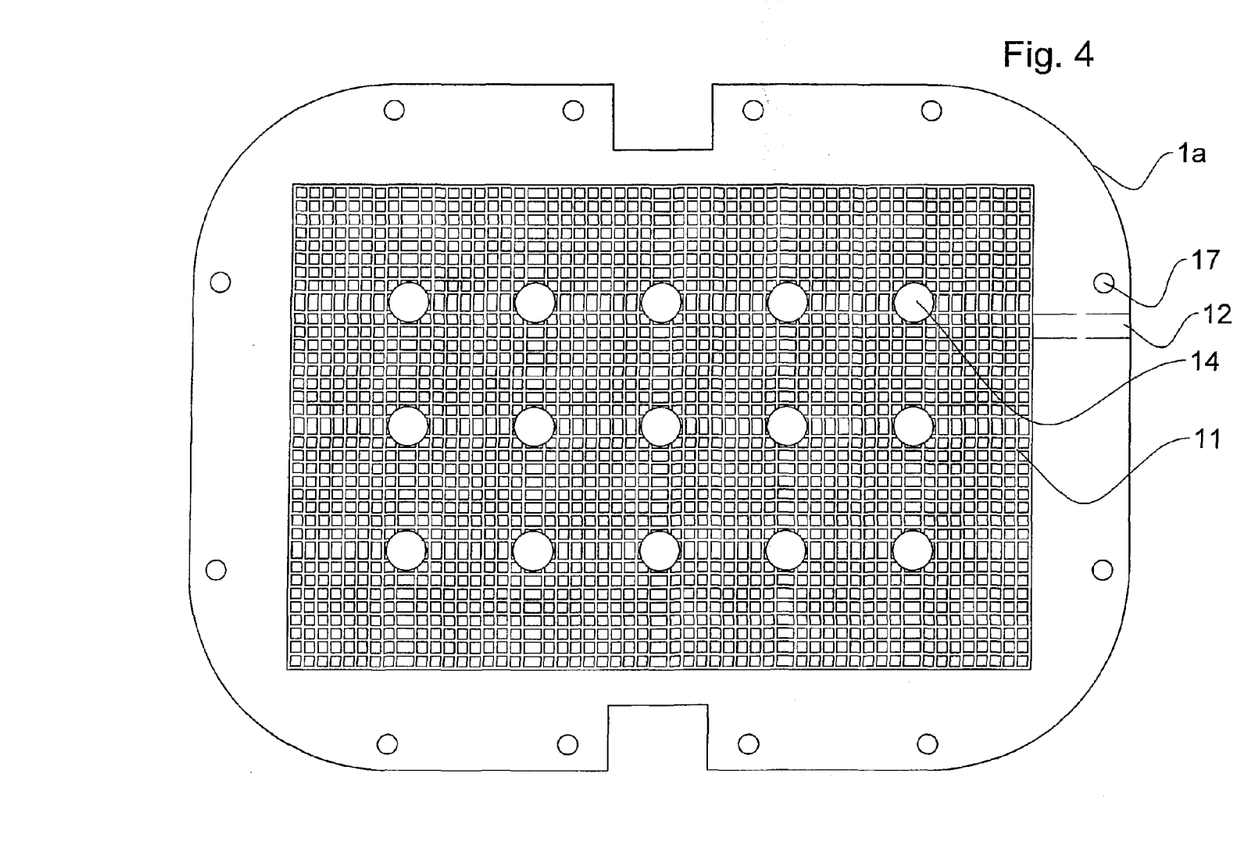
FIG. 4 is a bottom view of the upper marginal cover with grooves for distribution of electrolyte and passages for the heat exchange media.

A front sectional view of an accumulator with an external circulation system of the heat exchange media is shown in FIG. 1. Individual metal frames 3 are stacked one above the other in a housing 10 between an upper cover 1a illustrated in a plan view in FIG. 4, and a lower cover 1b. The same frames are shown in a plan view in FIG. 2.

Figure 5:
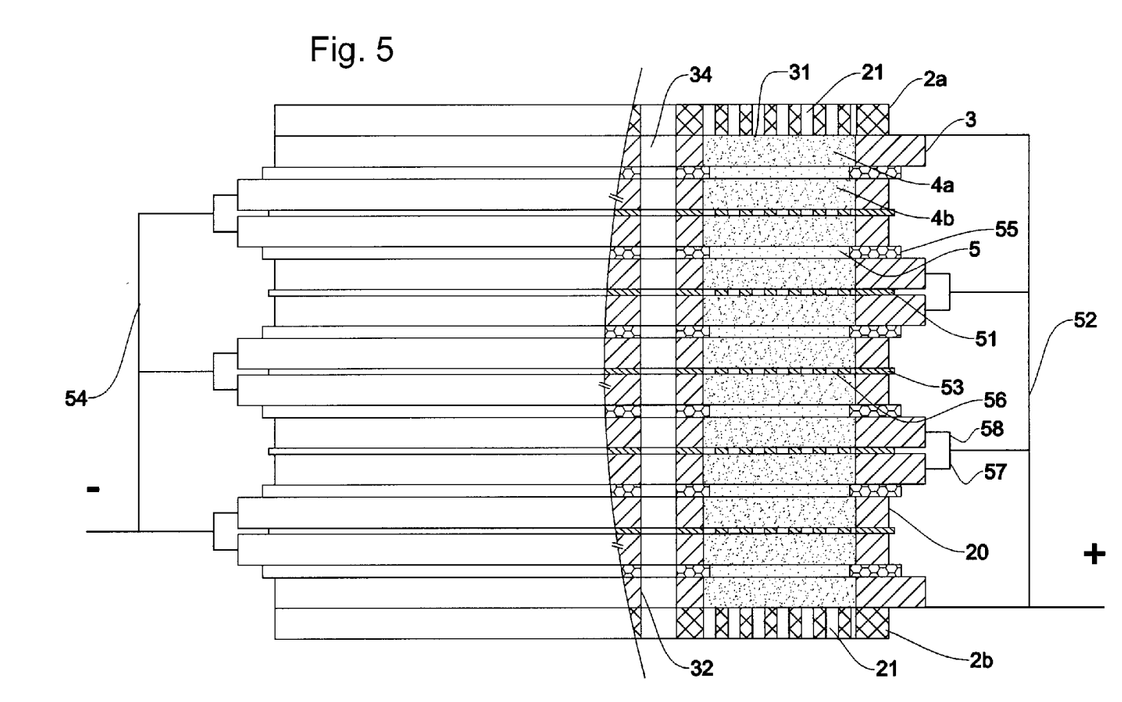
FIG. 5 is a partial sectional view of the internal part of the accumulator—one module with its components shown in detail.

Sets of pairs of frames 3 with electrodes 4a, 4b arranged in a stack are shown in detail in FIG. 5. Each frame contains a set of three identically positioned holes for electrodes 31 and a set of identically displayed channels 32. All holes 31 of each frame 3 are filled up with either 3D hard-pressed positive electrodes 4a or 3D hard-pressed negative electrodes 4b, as shown in detail together with other components in FIG. 5. The term 3D shall mean the so-called three-dimensional electrodes and according to this invention, electrodes having a minimum thickness of 0.5 mm. The number of holes 31 for the electrodes and channels 32 in one frame 3 is practically unlimited and depends on desired accumulator capacity. All electrodes 4a in the holes 31 of the frame 3 constitute together one electrode of one polarity; in this embodiment a positive electrode. All electrodes 4b in the next frame 3 constitute together one electrode of the other polarity, in this embodiment a negative electrode 4b. Each pair of frames 3 with electrodes 4a and 4b are separated by separators 5 and constitute one set of frames 3 representing one accumulator cell. The openings 31 and accordingly the electrodes 4a, 4b, can have any flat shape, including the illustrated circular profile, with respect to the manufacturing technology. The system of channels 32 identically positioned above each other form together passages 34 for distribution of a heat exchange media.

The frames 3 with the hard-pressed electrodes 4a, 4b conduct away and distribute the heat losses generated during chemical reactions accompanying the accumulator charging and discharging. Alternatively, the frames bring in and distribute heat supplied from an external source via heat transfer medium to increase the temperature of the accumulator. FIG. 1 shows the pipes for heat exchange media 14 installed into passages 34.

The sectional view of FIG. 5 illustrating the stack of frames 3 further shows that the electrode 4a, in this case the positive electrode, is separated from the negative electrode 4b by the separator 5. According to this example, each electrode 4a, 4b, after being hard-pressed into the hole 31, has a thickness of 2 mm. The frames 3 are of the same thickness as the electrodes 4a, 4b. An electro-insulating material 55 is inserted between the frames with different polarity. Suitable electro-insulating materials are chemically and thermally resistant substances, for example ceramic oxides, such as $Al_2O_3$, $SiO_2$, $ZrO_2$. Another electro-insulating materials can be polytetrafluoroethylene PTFE (Teflon), a polymeric fluoroelastomer such as vinylidene fluoride-hexafluorporopene, also known under the trademark Viton or cycloolefine polymer known under the brand Zeonor.

Additional current collectors, electrically conductive foils 51, 53, in the form of grids, expanded metal or foils made of a conductive metal are inserted between the frames 3 between electrodes of the same polarity. In this version, the electrically conductive foils 51 and 53 are perforated 56 in the area facing the electrodes to facilitate the passage of electrolyte. These additional current collectors enable the electrical charge transfer to the frames 3 as the main current collectors. The frames 3 with electrodes of the same polarity are further provided with contacts 57, 58, which, in this embodiment, are connected to the positive pole 52 of the accumulator on one side and to the negative pole 54 of the accumulator on the other side. Possible material compositions and different variants of 3D electrode configurations are described in more details in WO2010031363.

The electrodes 4a, 4b placed into the concentric holes 31 in frames 3, together with the frames 3, separators 5, electro-insulating material 55 and the additional current collectors 51, 53 form accumulator modules 20, which contain passages 34 for heat exchange medium.

Figure 3:
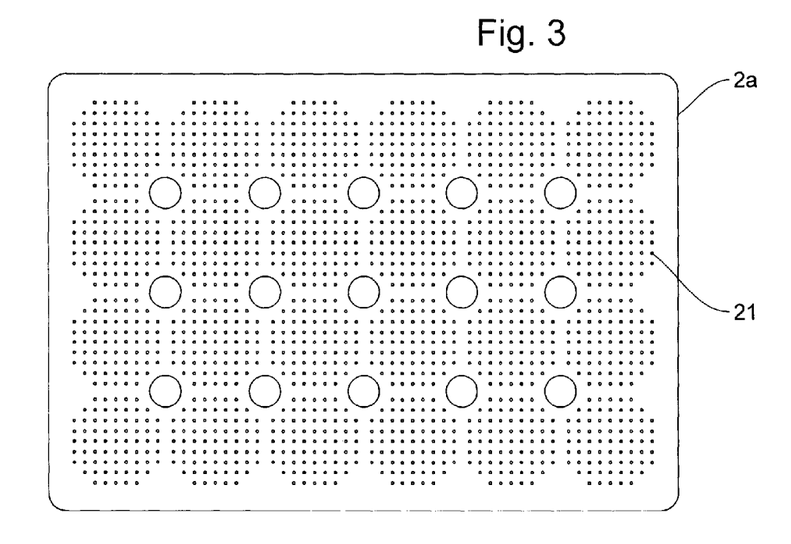
FIG. 3 is a plan view of an electrolyte distribution board.

In the embodiment of FIG. 1, the individual heat transfer tubes 14 are inserted into passages 34. The modules 20 are completed by an upper distribution board 2a and a lower distribution plate 2b. Both plates shown in the plan view of FIG. 3 have a system of punctures 21 above the surfaces of electrodes 4a, 4b and are practically identical. The punctures 21 enable the individual modules 20 supply and draining off the electrolyte during its replacement, and also degassing of the internal space of the modules. The upper cover 1a and the lower cover 1b are fitted to the distribution boards 2a, 2b, on the inner side with a system of distribution grooves 11, as shown in the plan view of the cover 1a in FIG. 4. The marginal openings 17 on the covers 1a, 1b are designed for safe connection of covers 1a, 1b, and fixation of the stack of frames 3 between them by means of bolts, not shown in the drawings.

The electrolyte is supplied into the upper cover 1a through an inlet 12, while the lower cover 1b can be similarly equipped with an electrolyte outlet, not shown in this Figure. At one end, the heat exchange pipes 14 are fastened to and sealed into an upper divider 13a. The divider 13a is located above the cover 1a and defines an upper chamber 15a. At the other end, the heat transfer tubes 14 are fastened to and sealed in a bottom divider 13b situated under the cover 1b and defining a lower chamber 15b. The upper chamber 15a is connected through an inlet piping 81 to a pump 8, which pumps the heat exchange medium from a heat exchanger 18 to the interior of the accumulator housing 10. The lower chamber 15b is connected to the return piping 82 with a heat exchanger 18. Alternatively, can the tubes 14 above the covers 1a, 1b, be individually connected directly to the intake manifold 81 and to the return piping 82. When using the described type of accumulator in a car a car radiator can be used as a heat exchanger. It is obvious for those skilled in art that the above described cooling system can be applied also in the case where the accumulator is composed of only one module 20 with one passage 34.

Figure 6:
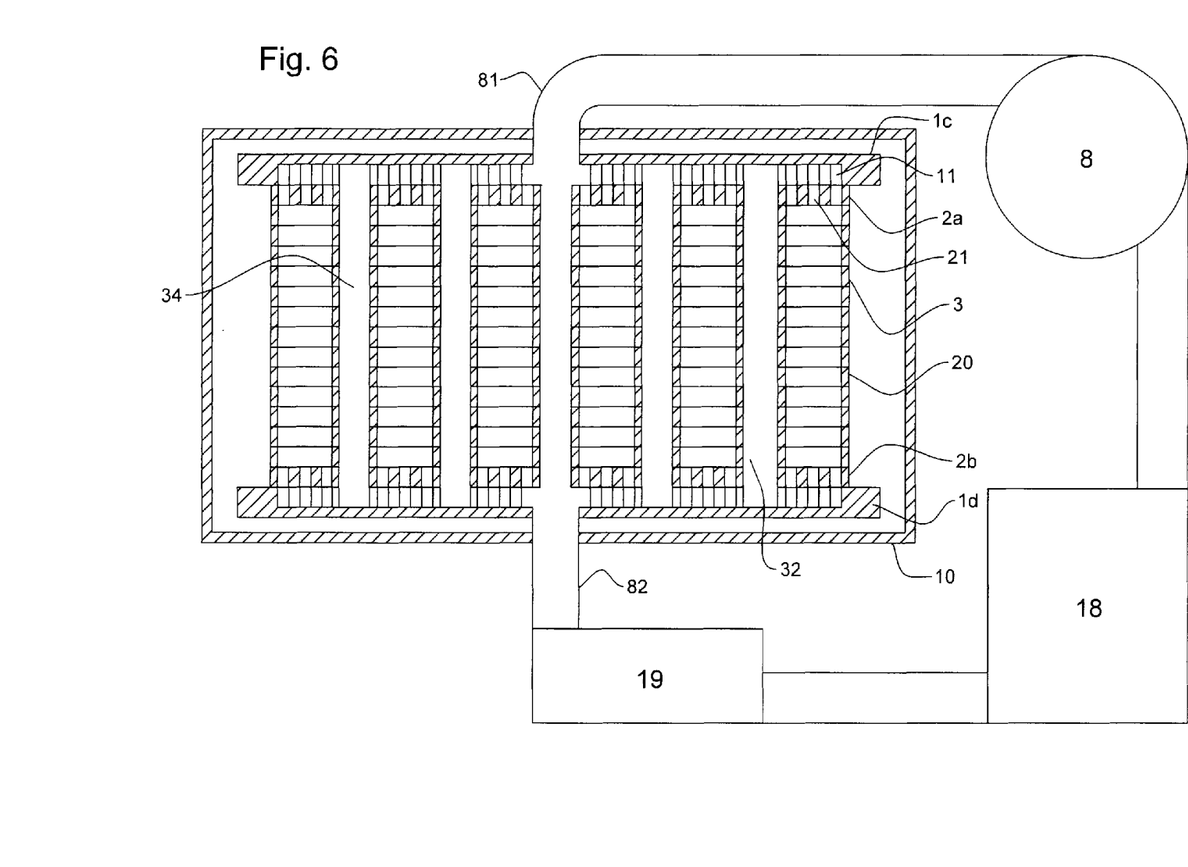
FIG. 6 is a front sectional view of an accumulator with a circulation distribution system of electrolyte as a heat exchange media and with the direct flow of electrolyte through the accumulator.
Figure 7:
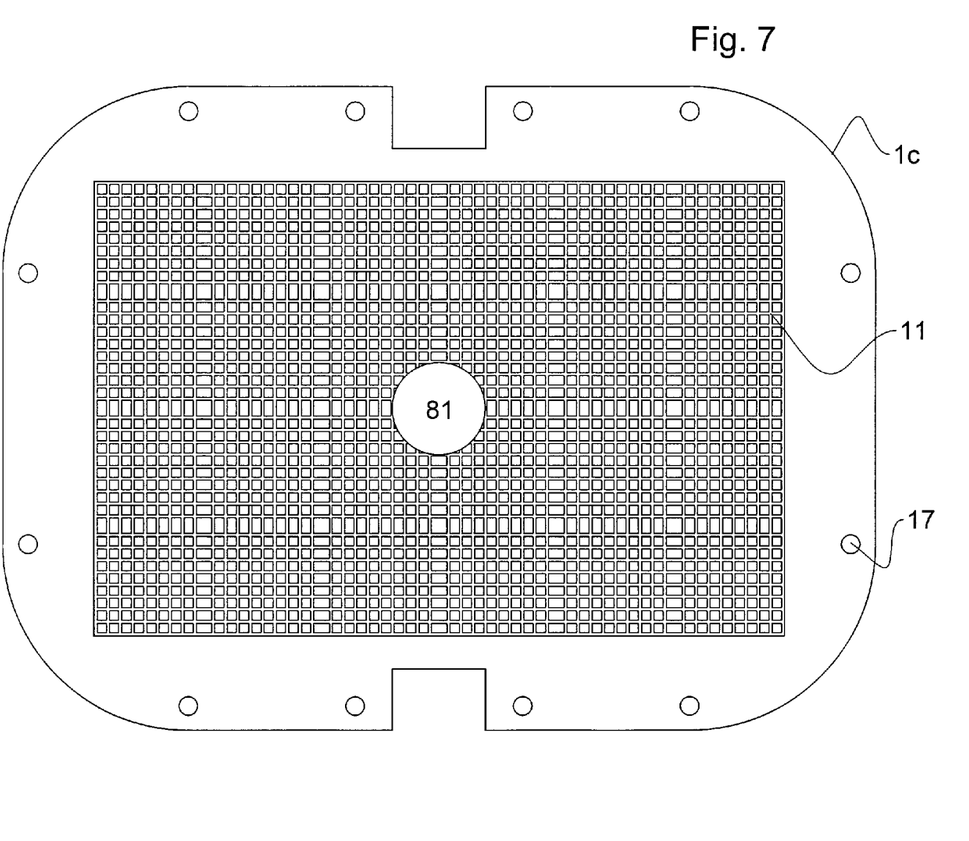
FIG. 7 is an internal view of the upper and lower cover with grooves for electrolyte distribution according to FIG. 6.

FIG. 6 shows another variant of the accumulator cooling, in which an electrolyte is used as a heat transfer medium directly flowing through the accumulator. A suitable liquid electrolyte for temperatures up to 85° C. is for example $LiPF_6$ in a solution of ethylene carbonate (EC) and propylene carbonate (PC), etc. The manifold 81 connected to the pump 8, enters directly into the center of the upper cover 1c as shown in the plane view of FIG. 7. The upper cover 1c is practically identical as the lower cover 1d, with the manifold connected to the return piping 82 in the centre of the cover.

Similar to the previously described version with the external heat exchange media, the distributions boards 2a, 2b are inserted between the covers 1c, 1d and the modules 20 to enable supply of an electrolyte distributed through grooves 11 into the individual modules 20 and similar to the previous version, the frames 3 include the system of holes 31 for electrodes and system of channels 22 constituting passages 34 for distribution of the heat exchange media, in this case an electrolyte.

Figure 9A:
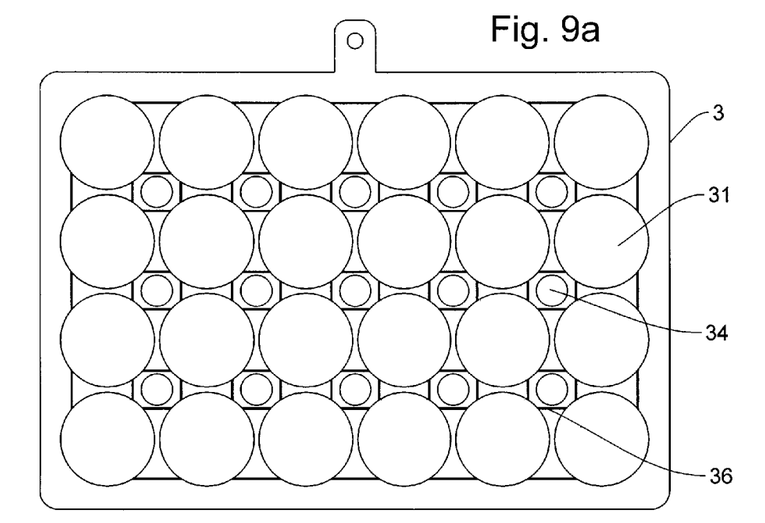
FIG. 9a is a view of a frame with grooves for distribution of electrolyte to electrodes.
Figure 9B:
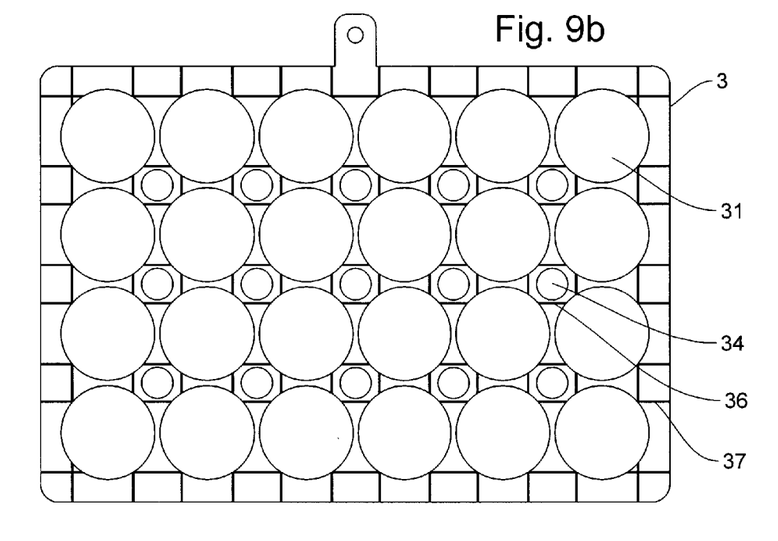
FIG. 9b is a view of a frame with grooves for distribution of electrolyte to electrodes and outside the frame.
Figure 9C:
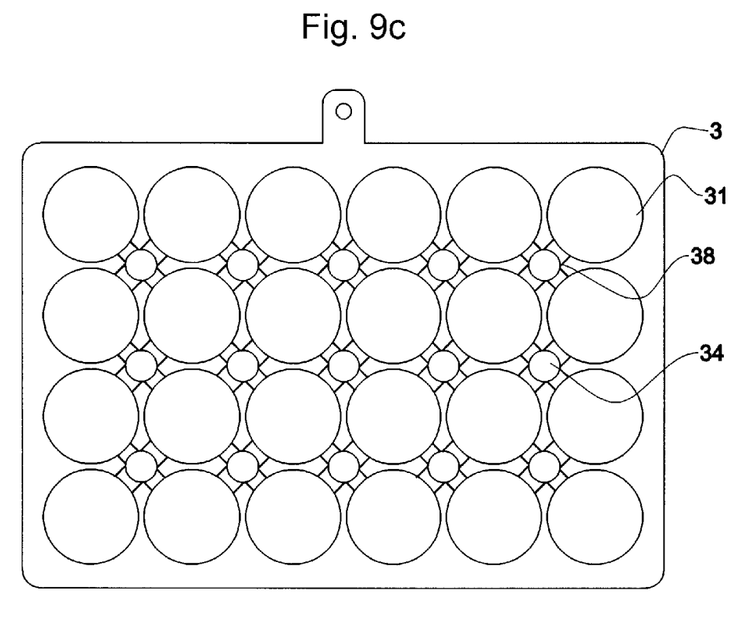
FIG. 9c is a view of a frame with grooves for distribution of electrolyte to electrodes and the distribution system.

To facilitate the electrolyte supply into the openings 31 and subsequently to the electrodes 4a, 4b and separators 5, and to allow easier replacement of electrolyte and degassing of the accumulator, the frames 3 can be provided with a system of grooves 36, 37, 38 on one or both contact surfaces. According to FIG. 9a the system of grooves is limited to internal grooves 36, which distribute the electrolyte to openings 32 with electrodes 4a 4b. As shown in FIG. 9b this system may be extended to include outer grooves 37 that allow the electrolyte to be also supplied from the lateral compartment 35 of the housing 10. FIG. 9c shows a system of grooves 38 made in the frame 3 of the accumulator with an electrolyte as heat exchange media. In this embodiment the grooves 38 connect the passages 34 directly with holes 31. Instead of grooves 36, 37, or in addition to grooves 36, 37, the electro-insulating material 55 can be replaced with a plasma-coated porous electrical insulating layer across the whole connecting surfaces of the frame 3, which also allows penetration of the electrolyte from passages 34 and lateral space 35 to electrodes 4a, 4b and the separators 5.

A regeneration unit 19 is incorporated into the return piping 82 upstream of the heat exchanger. Such unit can be a filter for electrolyte cleaning from undesired products of chemical reactions, which take place in the accumulator modules 20. Such products may be HF, $H_2O$, or released ions of manganese and its compounds, mechanical particles, etc. The regeneration unit 19 can work on mechanical, chemical, sorption and electrochemical principle, using lithium membranes, etc. Electrolyte cleaning significantly prolongs the accumulator operation life.

Figure 8:
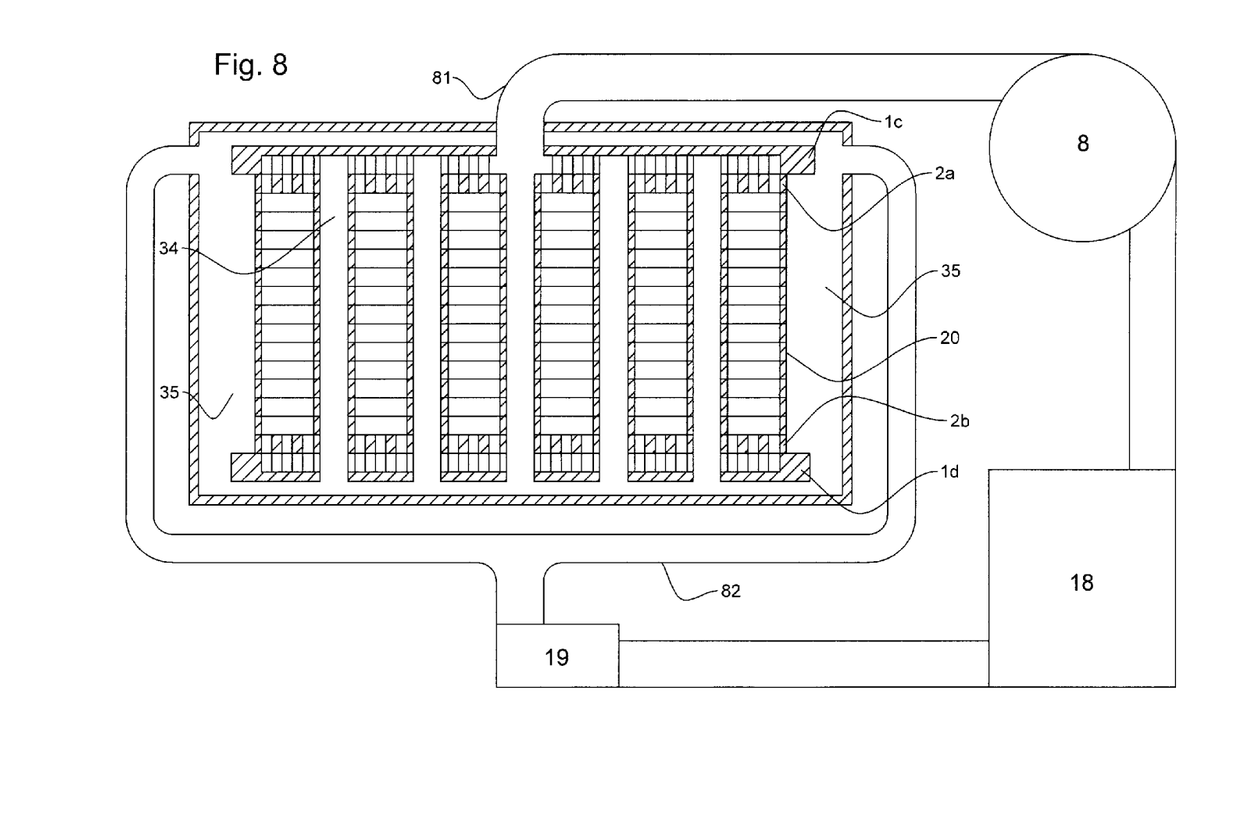
FIG. 8 is a front sectional view of an accumulator with the circulation distributing system of electrolyte as a heat exchange media and with the return flow of electrolyte.

FIG. 8 shows another embodiment of an electrolyte-cooled accumulator, which differs from the previous versions only by the way in which the electrolyte flows through the accumulator. The return piping 82 is connected to the housing 10 in the area of the upper cover 1c so the electrolyte, after flowing through the passages 34, returns from the bottom part of the housing space 10 across the lateral compartment 35 to the top part of the housing 10. Then, the electrolyte is delivered through the piping 82 to the regeneration unit 19. When introducing the electrolyte stream into the lateral compartment 35, the heat transfer surface is extended by the vertical walls of the housing 10 and the overall heat exchange rate is increased. For the same purpose, the housing 10 can be provided with cooling fins on any suitable surface.

Figure 10:
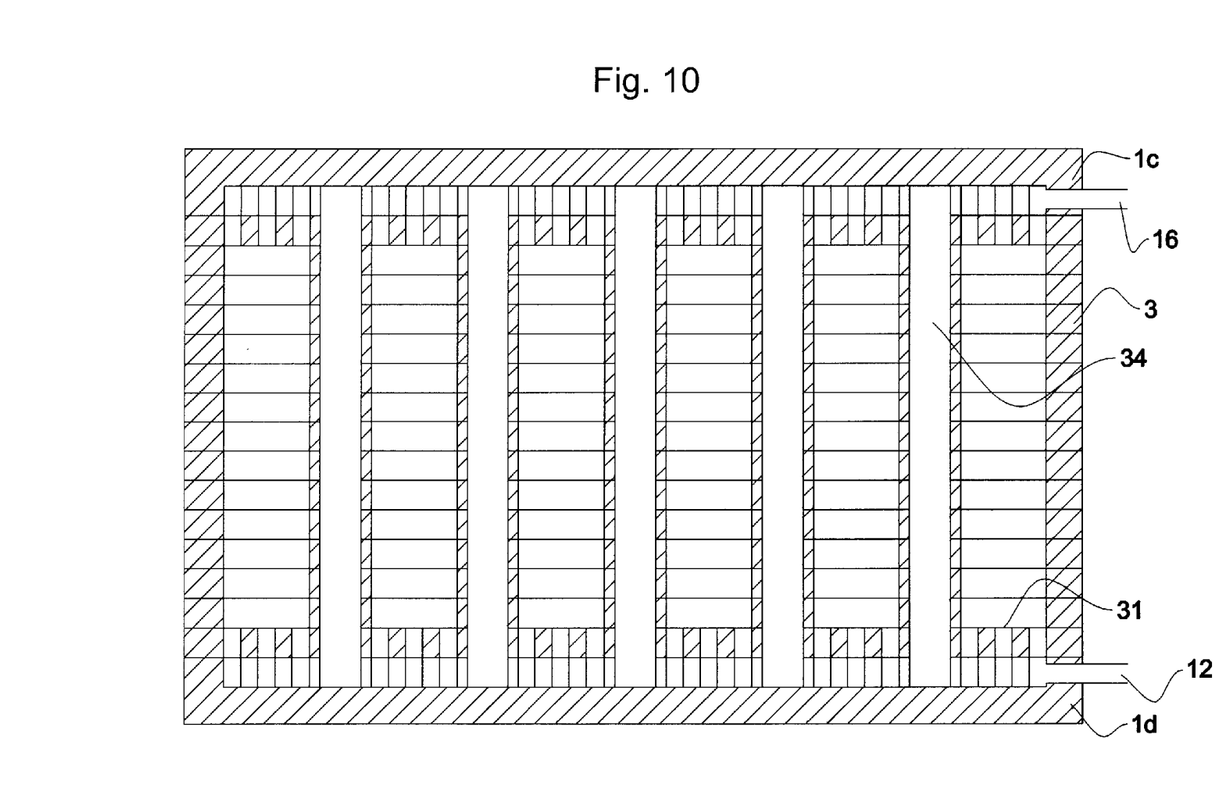
FIG. 10 is a front sectional view of a simple accumulator without casing.

FIG. 10 shows a simple version of the accumulator where the accumulator does not have an external heat exchange media distribution system, electrolyte container and housing. The housing of the accumulator is defined only by outer surfaces of the frames 3 and the covers 1c, 1d. The accumulator is cooled by natural circulation of the heat exchange medium, along the large area of metal frames 3. The removal of heat from the inside of the accumulator is happening through the circulation of electrolyte between electrodes 4a, 4b in openings 31, passages 34 and covers 1c, 1d due to the differences between temperatures in various parts of the accumulator 31. The cover 1d is connected to the inlet 12 for electrolyte fill up and the cover 1c is provided with inlet branch 16 for connection to a gas release valve (not shown). To achieve a greater cooling effect, the covers 1c, 1d can also be provided with cooling fins. This simplified version is suitable for accumulators of lower power, producing smaller heat losses, for example starter accumulators.

INDUSTRIAL APPLICABILITY

The invention can be used for construction of high-capacity energy storage accumulators and accumulators with high safety for use in vehicles exposed to extreme thermal conditions, shocks and vibrations.

The invention claimed is:

1. A lithium accumulator with positive and negative polarity electrodes of minimum thickness of 0.5 mm immersed in a liquid electrolyte and separated by separators comprising:
   marginal covers,
   a set of frames arranged in a stack between the marginal covers, wherein each frame contains more than one identically situated hole for the electrode and at least one identically positioned channel between the holes to form passage for the liquid electrolyte as a heat exchange medium through the frames,
   and electro-insulating material separating the frames with the electrodes of the positive and negative polarity, current collectors for electrical connection of electrodes of the same polarity,
   whereby the identically situated electrodes in the holes of the frames together with the adjacent parts of frames, separators, electro-insulating material and current collectors form individual accumulator modules.

2. The lithium accumulator of claim 1 wherein the marginal covers are provided with a system of interconnected grooves on their inner side opposite the holes and at least one cover is connected to an inlet of the liquid electrolyte.

3. The lithium accumulator of claim 2 wherein a distribution board provided with openings for connection of the grooves with the holes in the frame is disposed between the cover and the adjacent frame.

4. The lithium accumulator of claim 1 wherein distribution pipes are located within the passages and the ends of the distribution pipes are connected to a distribution system of the heat exchange medium.

5. The lithium accumulator of claim 4 wherein the heat exchange medium distribution system includes a pump and a heat exchanger.

6. The lithium accumulator of claim 1 wherein the frames carrying electrodes of the same polarity are provided with grooves on their adjacent surfaces for connecting the passages with the holes.

7. The lithium accumulator of claim 6 wherein the one cover comprises an inlet of the liquid electrolyte and the other cover is provided with an inlet branch for connection to an air-relief valve.

8. The lithium accumulator of claim 6 wherein the one cover is connected to the inlet piping of the liquid electrolyte distribution system and the other cover is connected to the return piping of the liquid electrolyte distribution system.

9. The lithium accumulator of claim 8 wherein the liquid electrolyte distribution system includes a pump and a heat exchanger.

10. The lithium accumulator of claim 9 wherein a liquid electrolyte regeneration unit is incorporated into the return piping.

11. The lithium accumulator of claim 1 wherein the frames are provided with electrical contacts and electrically conductive foils are inserted between the frames with the electrodes of the same polarity, whereby the contacts of the frames carrying the electrodes of the same polarity form an accumulator pole.

12. The lithium accumulator of claim 1 wherein the electro-insulating material is elected from the group of ceramic oxides $Al_2O_3$, $SiO_2$, $ZrO_2$ polytetrafluoroethylene, polyfluoride-hexafluoropropene, polycycloolefine.

13. The lithium accumulator of claim 1 wherein the electro-insulating material is a plasma coated porous electro-insulating material.

* * * * *